United States Patent [19]
Asada

[11] Patent Number: 5,090,536
[45] Date of Patent: Feb. 25, 1992

[54] SELF ADJUSTER FOR PUSH TYPE CLUTCH
[75] Inventor: Masaaki Asada, Neyagawa, Japan
[73] Assignee: Kabushiki Kaisha Daikin Seisakusho, Osaka, Japan
[21] Appl. No.: 666,772
[22] Filed: Mar. 8, 1991
[30] Foreign Application Priority Data
Mar. 14, 1990 [JP] Japan .................... 2-26472[U]
[51] Int. Cl.⁵ ............................... F16D 13/75
[52] U.S. Cl. ..................... 192/70.25; 192/111 A
[58] Field of Search ................ 192/70.25, 111 A

[56]       References Cited
       U.S. PATENT DOCUMENTS

| 2,207,051 | 7/1940 | Colman | 192/111 A |
| 2,280,355 | 4/1942 | Spase et al. | 192/111 A |
| 3,235,049 | 2/1966 | Hufstader | 192/89 B |
| 3,752,286 | 8/1973 | Sink | 192/111 A |
| 4,099,604 | 7/1978 | Higgerson | 192/111 A |
| 4,549,643 | 10/1985 | Flotow et al. | 192/111 A |

FOREIGN PATENT DOCUMENTS

| 1288396 | 2/1987 | U.S.S.R. | 192/111 A |
| 1333908 | 8/1987 | U.S.S.R. | 192/111 A |

Primary Examiner—Rodney H. Bonck
Attorney, Agent, or Firm—Armstrong, Nikaido, Marmelstein, Kubovcik & Murray

[57]       ABSTRACT

In a push-type clutch, a facing wear adjustment nearly annular adjust ring with which an outer peripheral part of a diaphragm spring contacts from a side opposite to a flywheel is screwed into an inside face of a pressure plate so as to be movable in a clutch axial direction, so that a worm wheel is rotated by a bracket moving in a clutch axial direction to rotate the adjust ring when a facing is worn out. The adjust ring position can thus be adjusted automatically to a diaphragm spring side by a wear amount of the facing.

4 Claims, 8 Drawing Sheets

SELF ADJUSTER FOR PUSH TYPE CLUTCH

BACKGROUND OF THE INVENTION

1. Industrial Useful Field

This invention relates to a push-type clutch wherein a release bearing, to which an inner peripheral part of a diaphragm spring is coupled, is pushed toward a flywheel side and an outer peripheral part of the diaphragm spring is moved in the opposite direction, so as to release the clutch. This invention especially relates, in detail, to a self adjuster for automatic adjustment of the clutch as wear of facing occurs.

2. Prior Art and Its Problem

As regards the pull-type clutch equipped with the mechanism enabling the adjustment according to the wear of facing, such mechanism is shown in applicant's Japan Patent Application No. 61-142140.

In such mechanism hereof, a diaphragm spring 5, a retainer 7, a lever 50 (load transmission lever) and a pressure plate 2 are installed inside a clutch cover 4. Releasing operation is carried out by a release lever 6c through a sleeve 6a and a release bearing 6b which are coupled to the retainer 7. The retainer 7 is locked by a pin 7b, and the pin 7b is secured by a flange 7c to the clutch cover 4.

In FIG. 10, 50a is an outside fulcrum point of the lever 50 and 51 is an inertial brake, 3 and 3 are clutch discs, 3a and 3a are clutch facings, 52 is an intermediate plate and 1 is an engine flywheel.

The lever 50 is interposed between the retainer 7 and an adjust ring 11 threaded clutch cover 4. When the facings 3a and 3a of the clutch discs 3 and 3 are worn out, the position of adjust ring 11 is adjusted in a clutch axial direction by turning a threaded part 11a of the adjust ring 11. Therefore, the adjusting work is troublesome.

On the other hand, as regards an automatic adjusting device for a clutch, Japan Patent Application (KOKAI) No. 60-143228, based on U.S. Pat. No. 4,549,643, is well known. This device is composed of the first boss member having a worm screw on its outer peripheral surface, a second boss member having a pin, and first and second coil springs connecting both boss members etc. Because both boss members are resiliently connected by elastic forces of the first and second coil springs, in such automatic adjusting device automatic adjustment can not be done smoothly.

In applicant's Japanese Utility Model Applications No.1-4594 and No.1-4595, corresponding to U.S. Pat. No. 5,029,687, an adjuster for pull-type clutch enables an automatic position adjustment of the adjust ring and further enables a smooth adjustment thereof when the facings are worn out. In a push-type clutch, however, the above-mentioned self adjuster has been unknown.

OBJECT OF THE INVENTION

An object of the invention is to provide a self adjuster for push-type clutch which enables an automatic and smooth positional adjustment of an adjust ring when a facing is worn out.

SUMMARY OF THE INVENTION

In a push-type clutch wherein a release bearing, to which an inner peripheral part of a diaphragm spring is coupled, is pushed toward a flywheel side and moves an outer peripheral part of a diaphragm spring is an opposite direction to release the clutch; this invention provides a self adjuster for such push-type clutch, in which a facing wear adjustment ring for contact with an outer peripheral part of the diaphragm spring from a side of the spring facing the flywheel is threaded into the pressure plate so as to be movable in an axial direction relative to the clutch. A stay bracket, having two support lugs extending in the vicinity of an inside face of the adjust ring, with a specified width between the lugs in a clutch circumferential direction, is secured to the clutch cover with a pin between the lugs having opposite ends secured to the lugs support lugs. A worm wheel, having a worm threaded part on its outer peripheral surface, is fitted onto the pin adjacent one support lug so to be as freely rotatable on the pin. Ratchet external teeth, for one direction rotation of the worm wheel, are formed on a support lug side end portion of the worm wheel. A stopper, mating with the ratchet external teeth for preventing rotation of worm wheel in the reverse direction, is secured to the stay bracket. A sensing lever, having an arm extending in a radial direction of the clutch is mounted on the other support lug side of the pin and is freely rotatable in relation to the pin. A tip end of the arm of the sensing lever is located in a concave portion provided at an outer peripheral surface of a bracket connected to the release bearing. A ratchet tooth surface, for preventing the sensing lever from rotating but permitting rotation in the opposite direction relatively to the worm wheel, is formed on a worm wheel side end surface of the sensing lever. A spring member presses the sensing lever to the worm wheel side and a play creating mechanism gives the sensing lever, rotating with a movement of the bracket, a specified play relative to the worm wheel, such play being provided in order not to transmit a rotation of the sensing lever to the worm wheel, caused by a movement of the bracket during clutch engaging/releasing operation, before wear of the facing. A rack, which engages with the worm threaded part to move the adjust ring to the diaphragm spring side with a rotation of the worm threaded part after facing wear, is formed on an inside surface of the adjust ring.

In this invention, when the facing is worn out, the sensing lever rotates with the movement of the bracket and the worm wheel is thereby rotated to cause the adjust ring to rotate. In this way, the adjust ring is automatically adjusted by the amount of wear of the facing.

EMBODIMENTS

Figure 1:
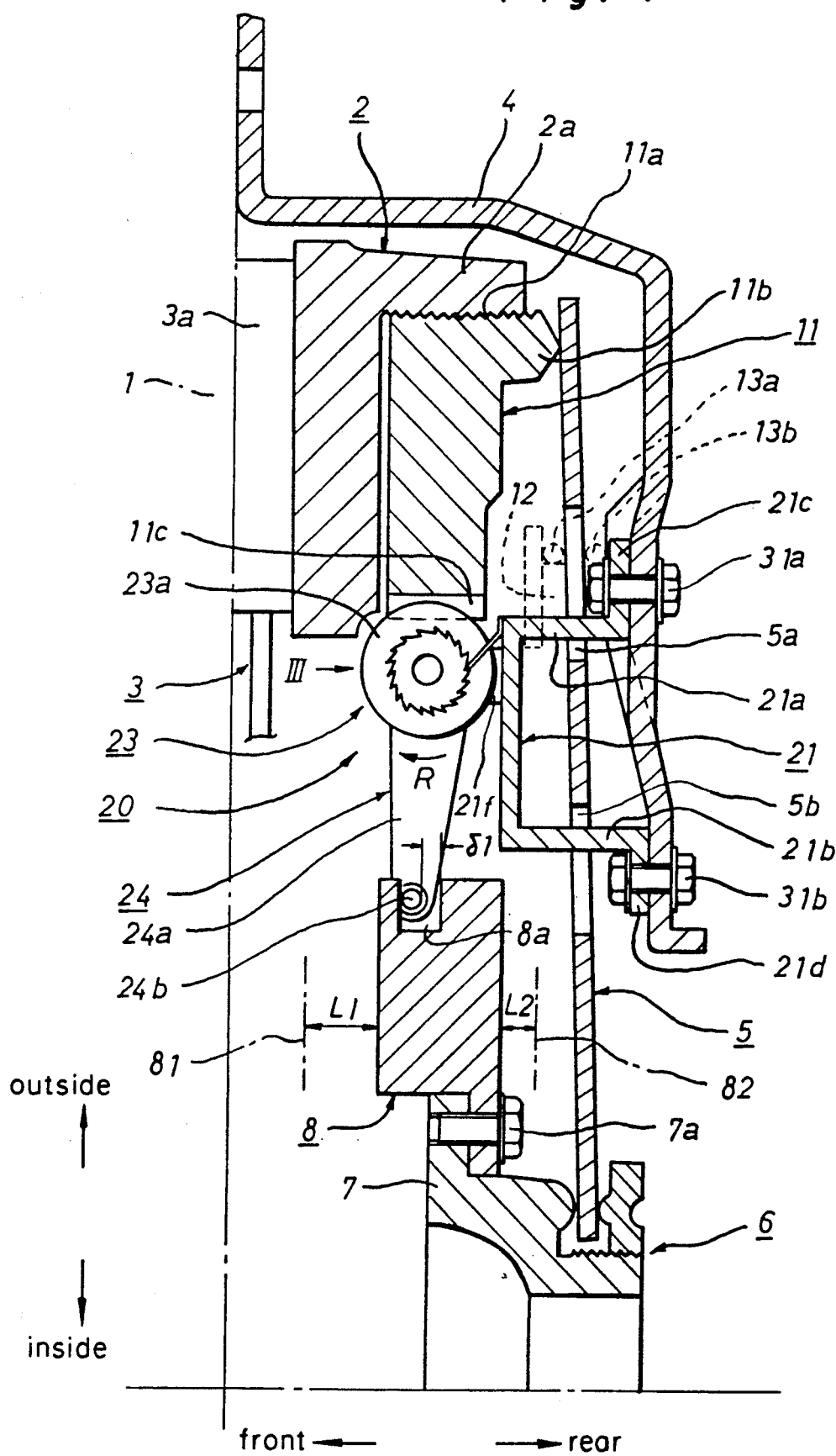
FIG. 1 is a vertical sectional view showing a push-type clutch equipped with a self adjuster of first embodiment of this invention.

In FIG. 1, 1 is a flywheel, 2 is a pressure plate, 3 is a clutch disc having a facing 3a at its outer peripheral part, 4 is a clutch cover an outer peripheral part of which is secured to the flywheel 1, 5 is a diaphragm spring.

A substantially adjustment annular ring 11 fits in an inside surface of a convex portion 2a protruding axially rearward from an outer peripheral part of pressure plate 2. The adjustment ring 11 is threaded into the convex portion 2a at a threaded part 11a in the axial direction of the clutch so as to allow positional adjustment. An outer peripheral part of the diaphragm spring 5 is in contact from a rear side of adjustment ring 11 at a convex portion 11b protruding axially of the clutch and rearward from an outer peripheral part of adjustment ring 11. The diaphragm spring 5 is supported by clutch cover 4 and is held between two wire rings 13a and 13b supported by a stud 12 at its approx. intermediate portion. The inner peripheral part of diaphragm spring 5 is coupled to a release bearing mechanism 6 in retainer.

Figure 2:
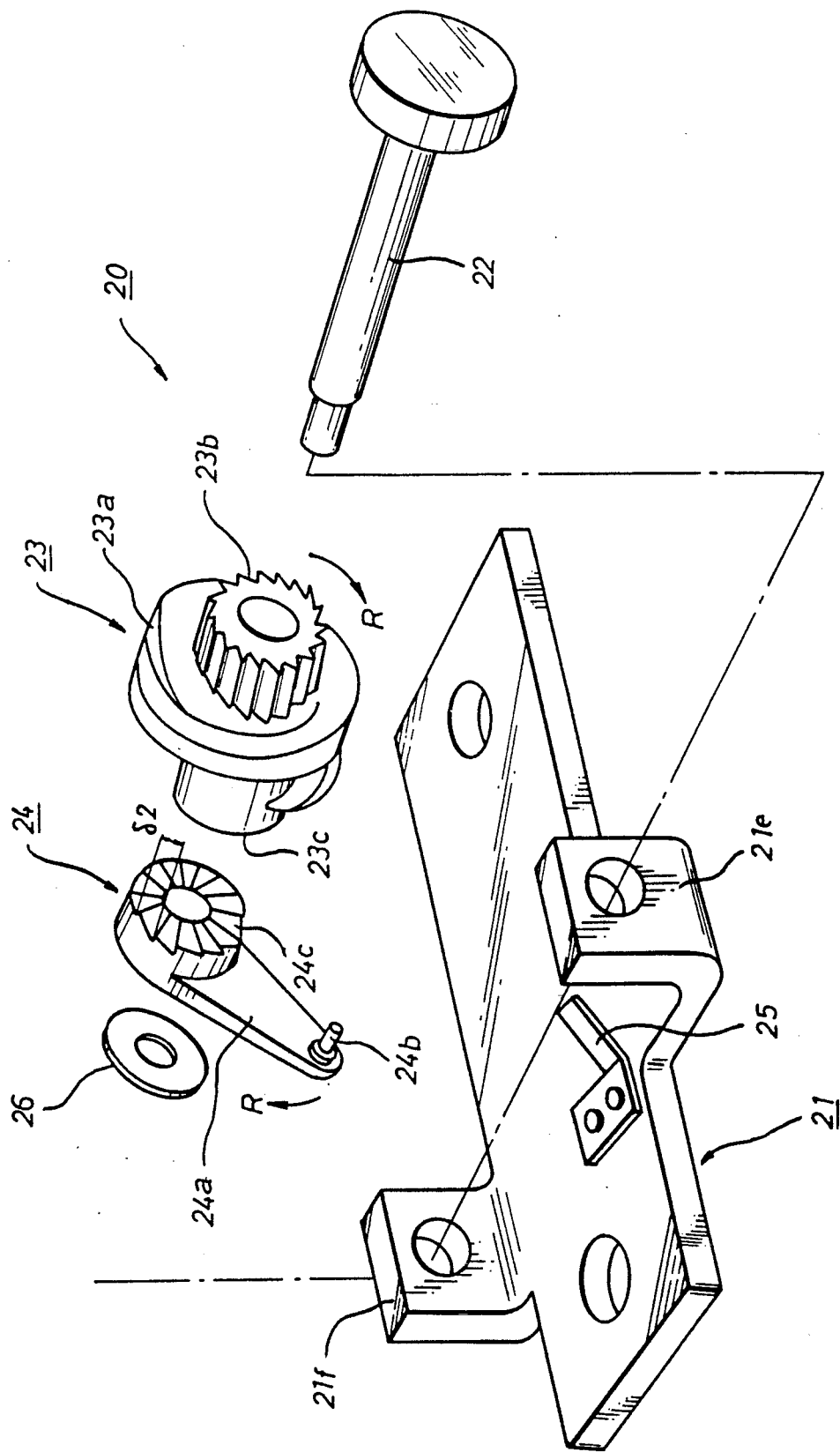
FIG. 2 is an oblique exploded view of the self adjuster of FIG. 1.
Figure 3:
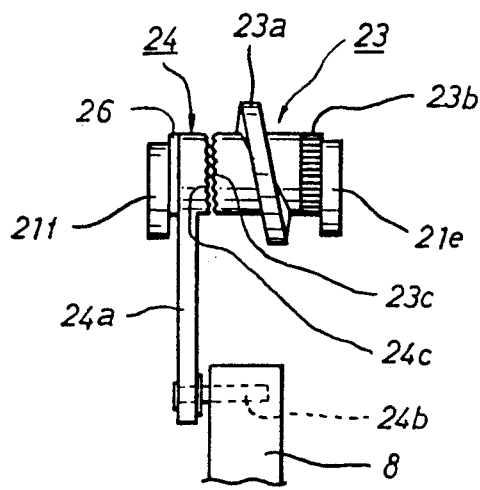
FIG. 3 is a view in the direction of arrow III of FIG. 1.

A self adjuster 20, forming an essential part of this invention, is described hereunder. FIG. 2 is the oblique exploded view of the self adjuster 20 and FIG. 3 is a view in the direction of arrow III of FIG. 1. The self adjuster 20 is composed of a stay bracket 21, a pin 22, a worm wheel 23, a sensing lever 24 and conned disc spring 26 etc. The stay bracket 21 is made of an approx. band-shaped steel plate and is bent into an U-shape in its vertical section. Its radial outside end portion is bent outward and its inside radial end portion is bent inward, as best shown in FIG. 1. Outside end portion 21c is secured by a screw 31a to the clutch cover 4 and an inside end portion 21d is secured by a screw 31b to clutch cover 4. outer portion 21a passes through an outside opening 5a of diaphragm spring 5 and an inner portion 21b passes through an inside opening 5b of diaphragm spring 5. Two support lugs 21e and 21f are integrally bent from forward in the clutch direction stay bracket 21 radially inward of the adjustment ring 11 with a specified width left between such support lugs in a clutch circumferential direction. A pin 22 is supported by the support lugs 21e and 21f, and a worm wheel 23, a sensing lever 24 and a conned disc spring 26 etc. are mounted on pin 22.

Worm wheel 23 fits freely rotatably onto the pin 22 and is disposed in the vicinity of the support lug 21e between the two support lugs 21e and 21f. A worm threaded part 23a is formed on an outer peripheral surface of the central part of the worm wheel 23. Ratchet external teeth 23b are formed on a right end portion in FIG. 3 of the worm wheel 23 and are so formed as to engage with a stopper 25 fastened to the stay bracket 21 for allowing rotation of the worm wheel 23 only in a direction of arrow R (FIG. 2) and prevent rotation of the worm wheel 23 in the reverse direction. The stopper 25 is made of a leaf spring and its tip end is so urged as to engage with the ratchet external teeth 23b. Further, ratchet external teeth 23c are formed on a left end portion in FIG. 3 of the worm wheel 23.

The sensing lever 24 fits freely rotatably onto the pin 22 at a left side (support lug 21f side) in FIG. 3 of the worm wheel 23. The sensing lever 24 has an arm 24a extending radially inwardly in relation to the pin 22. Sensing pin 24b extends in parallel with the pin 22 and is mounted at the tip end of the arm 24a. A ratchet tooth surface 24c, mating with a ratchet tooth surface 23c of the worm wheel 23, is formed on a right end face in FIG. 3 of the sensing lever 24. These ratchet tooth surfaces 23c and 24c are so formed that they mate integrally each other when the sensing lever 24 rotates in the direction of arrow R (FIG. 2) and slide over each other when sensing lever 24 rotates in the reverse direction. One pitch between teeth of the ratchet tooth surface 24c of the sensing lever 24 is set to $\delta 2$. A size of $\delta 2$ will be described hereinafter.

The coned disc spring 26 (spring member) is compressibly installed between the left end face in FIG. 3 of the sensing lever 24 and the support lug 21f, and urges sensing lever 24 toward the worm wheel 23. A coil spring etc. may be used in place of coned disc spring 26.

Warm 23, the sensing lever 24 and the conned disc spring 26 are mounted between the support lugs 21e and 21f, and an end of the pin 22 secured by crimping work or by the ends and a nut etc.

In FIG. 1, racks 11c, mating with the worm threaded part 23a of the worm wheel 23, are formed on an inner peripheral surface of the adjustment ring 11 over the entire circumference thereof, so that the adjust ring 11 is rotated for movement in the axial direction, i.e. its positional adjustment, when the worm wheel 23 rotates.

The sensing pin 24b of the sensing lever 24 is located in the concave portion 8a formed on the bracket 8 fastened by a screw 7a to the retainer 7, with an axial play $\delta 1$ (FIG. 1) therebetween. The sensing lever 24 is so disposed that, under a clutch engaging state before the facing 3a is worn, the sensing pin 24b contacts with a flywheel 1 side wall of the concave portion 8a, as shown in FIG. 1. The apexes of the teeth on the ratchet tooth surface 24c contact with the apexes of the teeth on the ratchet tooth surface 23c so that the ratchet tooth surface 24c is in a state where it is lifted above the ratchet tooth surface 23c as shown in FIG. 3. $\delta 1$ is set smaller than an axial moving distance L1(FIG. 1) of the bracket 8 accompanied by the releasing/engaging operation under ordinary state before wearing of the facing 3a, and $\delta 2$ is set equal to a rotating distance of the sensing lever 24 when the bracket 8 moves by a difference between L1 and $\delta 1$, while causing the sensing lever 24 to rotate. By thus providing the plays $\delta 1$ and $\delta 2$ of the sensing lever 24 relative to the worm wheel 23, the play creating mechanism inhibits self adjuster 20 to carry out the positional adjustment of the adjust ring 11 when the facing 3a is not worn.

Function will be described hereunder. FIG. 1 shows the clutch engaging state before wear on the facing 3a. It is assumed that the bracket 8 moves by a distance L1 in the axial direction (FIG. 1) up to a position shown by a chain line 81 in the engaging/releasing operation before wear on the facing 3a. In this instance, the self adjuster 20 functions as follows.

When the bracket 8 moves by the distance L1 to the position 81 in the releasing operation, the sensing lever 24 rotates in the direction R by $\delta 2$ and sensing pin 24b contacts the side wall of the concave portion 8a of the bracket 8 opposite the sidewall, because of the present of $\delta 1$ and $\delta 2$ are as mentioned above. However, the rotation of $\delta 2$ of the sensing lever 24 in the direction R is absorbed by the rotation of the ratchet tooth surface 24c until it mates with the ratchet tooth surface 23c. Thus, wheel 23 does not rotate, because one pitch between teeth on the ratchet tooth surface 24c of the sensing lever 24 is preset to $\delta 2$ and the sensing lever 24 is so disposed that, under the state of FIG. 1, the apexes of teeth on the ratchet tooth surface 24c contact with the apexes of teeth on the ratchet tooth surface 23c so that the ratchet tooth surface 24c is in the state where it is lifted above the ratchet tooth surface 23c. Further, when the bracket 8 is returned by the engaging operation from the position 81 to the state of FIG. 1, the sensing lever 24 rotates by δ2 in the direction reverse to R with the sensing pin 24b contacting with the flywheel 1 side wall of the concave portion 8a of the bracket 8. The ratchet tooth surface 24c slides and rotates by δ2 in relation to the ratchet tooth surface 23c so that the worm wheel 23 does not rotate. Consequently, the worm wheel 23 does not rotate in the clutch engaging-/releasing operation before wearing out of the facing 3a, so that adjustment ring 11 does not rotate and the positional adjustment by the self adjuster 20 is not carried out.

In the clutch engaging state, it is assumed that the bracket 8 is moved by L2(FIG. 1) in the direction opposite to the flywheel 1 up to a position of chain line 82 due to wear of the facing 3a. When the bracket 8 is moved by L2 up to the position 82, the sensing lever 24 is rotated in the direction reverse to R by a distance corresponding to L2 with the sensing pin 24b contacting with the flywheel 1 side wall of the concave portion 8a of the bracket 8. In this instance, the apexes of teeth of the ratchet tooth surface 24c slide and rotate by a distance corresponding to L2 so as to get over several teeth of the ratchet tooth surface 23c to contact with new teeth. When the bracket 8 is released from the position 82 to the position 81, the sensing lever 24 is rotated together with the worm wheel 23 in the direction R by a distance corresponding to the pitches gotten over by the ratchet tooth surface 24c while mating with the new teeth of the ratchet tooth surface 23c. When the worm wheel 23 rotates, the rack 11c of the adjustment ring 11 is rotatably driven by the worm threaded part 23a, so that adjustment ring 11 is moved by means of screw pitches of the threaded part 11a to the diaphragm spring 5 side. Accordingly, the adjust ring 11 is moved to the diaphragm spring 5 side until the facing 3a comes into the initial state before wearing out of the facing 3a by repeating the clutch releasing/engaging operations, so that relative positional relations between the diaphragm spring 5, the adjusting ring 11 etc. can be adjusted automatically.

In the above-mentioned operation, reverse rotation of the worm wheel 23 is prevented so that there is no chance for the adjustment ring 11 to adjust its position to the opposite side (to the flywheel 1 side), because the ratchet external teeth 23b are formed on the worm wheel 23 and the stopper 25 is installed.

Figure 6:
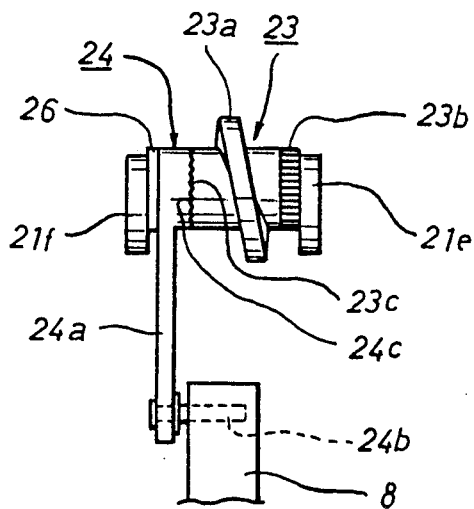
FIG. 6 is a view in the direction of arrow VI of FIG. 4.
Figure 4:
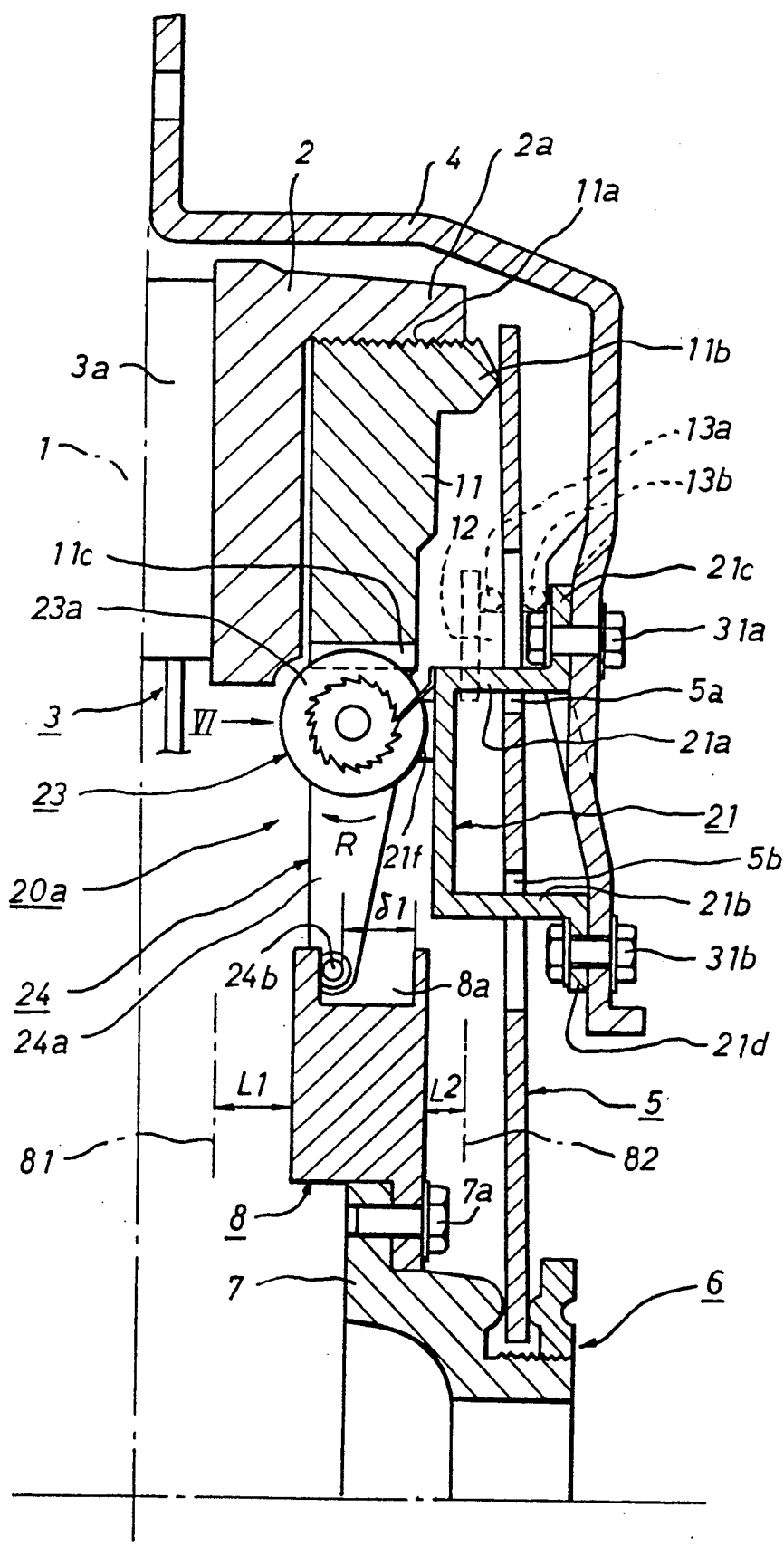
FIG. 4 is a vertical sectional view, similar to FIG. 1, but showing a second embodiment of this invention.
Figure 5:
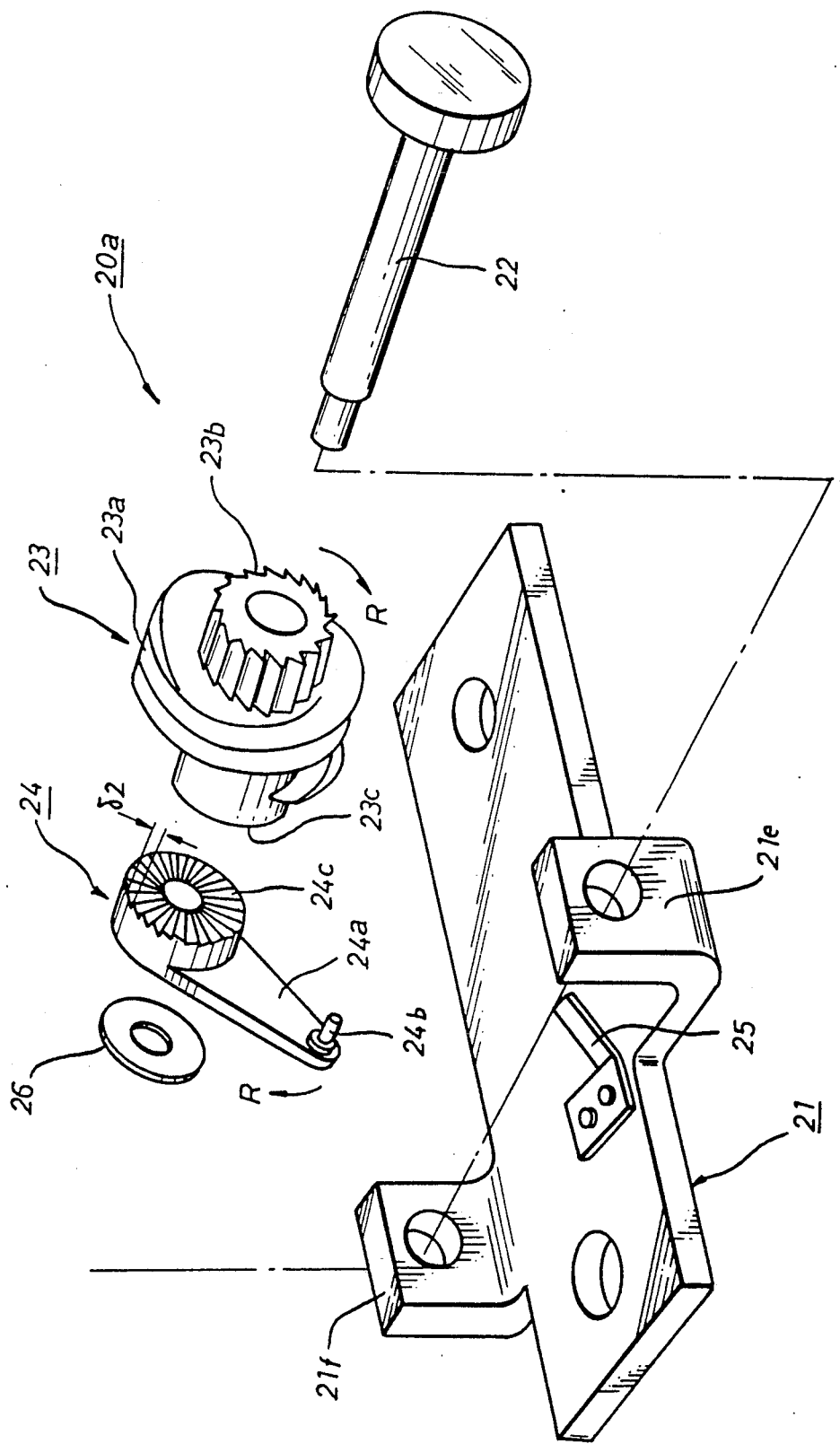
FIG. 5 is an exploded view of the self adjuster of FIG. 4.

FIG. 4 is the vertical sectional view showing the push-type clutch equipped with the self adjuster of second embodiment of this invention. FIG. 5 is an exploded view before assembling the self adjuster of FIG. 4. FIG. 6 is the view viewed in the direction of arrow VI of FIG. 4. A self adjuster 20a of the second embodiment is different from the self adjuster 20 of the first embodiment in the following point.

In the self adjuster 20a; one pitch δ2 of teeth of the ratchet tooth surfaces 23c and 24c is made as small as possible, and the sensing lever 24 is so disposed that, under a state of FIG. 4 i.e. under a clutch engaging state before wearing out of the facing 3a, the sensing pin 24b contacts with the flywheel 1 side wall of the concave portion 8a and the ratchet tooth surface 23c completely mates with the ratchet tooth surface 24c. Further, in the state of FIG. 4, the play δ1 between the sensing pin 24b and an opposite to the flywheel 1 side wall of the concave portion 8a is preset to a distance equal to the axial moving distance L1 (FIG. 4) of the bracket 8 accompanied by the releasing/engaging operation before wearing-out of the facing 3a. Namely, the play creating mechanism of the second embodiment is composed by providing the play δ1. Other structures are the same as those of the first embodiment, and symbols in FIG. 4 same as those of FIG. 1 to FIG. 3 correspond to the same or equivalent components.

Function will be described hereunder. FIG. 4 shows the clutch engaging state before wear on the facing 3a. When the bracket 8 moves by the distance L1 (FIG. 4) in the axial direction up to the position of 81 in the engaging/releasing operation before wear on the facing 3a, the self adjuster 20a functions as follows.

When the bracket 8 moves by the distance L1 up to the position 81 in the releasing operation, the sensing pin 24b only contacts the wall of the concave portion 8a of bracket 8 which is opposite to flywheel side 1. The sensing lever 24 does not rotate and worm wheel 23 does not rotate, because play is preset as δ1=L1. Further, when the bracket 8 is returned by the engaging operation from the position 81 to the state of FIG. 4, the sensing pin 24b contacts the flywheel 1 side wall of the concave portion 8a of the bracket 8, sensing lever 24 does not rotate and worm wheel 23 does not rotate. Consequently, the worm wheel 23 does not rotate in the clutch engaging/releasing operation before wear on the facing 3a. Adjustment ring 11 does not rotate and the positional adjustment by the self adjuster 20a is not carried out.

In the clutch engaging state, when the bracket 8 is moved by L2(FIG. 4) in the direction opposite to the flywheel 1 up to the position 82 due to the wear of the facing 3a, the sensing lever 24 is rotated in the direction reverse to R by a distance corresponding to L2 with the sensing pin 24b contacting with the flywheel 1 side wall of the concave portion 8a of the bracket 8. In this instance, the apexes of teeth of the ratchet tooth surface 24c slide and rotate by a distance corresponding to L2 and contact with the ratchet tooth surface 23c. Bracket 8 is released from the position 82 to the position 81, and the sensing lever 24 is rotated, together with the worm wheel 23, in the direction R by the distance L2 corresponding to the sliding distance of the ratchet tooth surface 24c relative to the ratchet tooth surface 23c. When the worm wheel 23 rotates, the rack 11c of adjustment ring 11 is rotatably driven by the worm threaded part 23a, so that adjustment ring 11 is moved by means of screw pitches of the threaded part 11a to the diaphram spring 5 side. Accordingly, adjustment ring 11 is moved to the diaphragm spring 5 side until the facing 3a comes into the initial state before wearing out of the facing 3a by repeating the clutch releasing/engaging operations. Thus, the relative positional relations between the diaphragm spring 5, adjustment ring 11 etc. is adjusted automatically.

Figure 9:
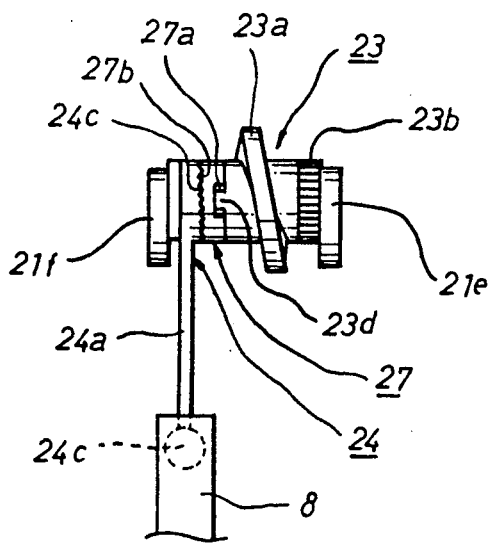
FIG. 9 is a view in direction of arrow IX of FIG. 7.
Figure 8:
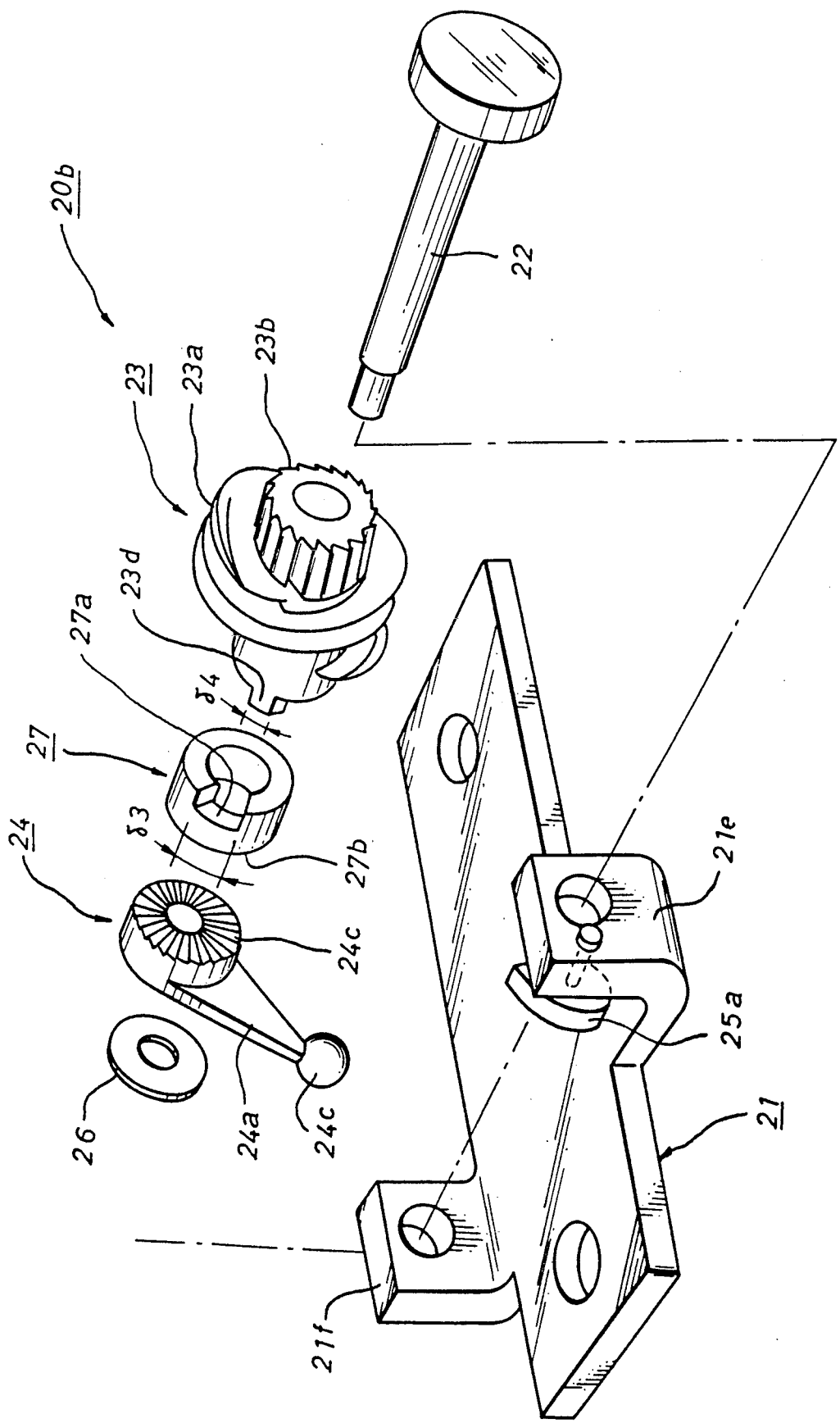
FIG. 8 is an exploded view of the self adjuster of FIG. 7.
Figure 7:
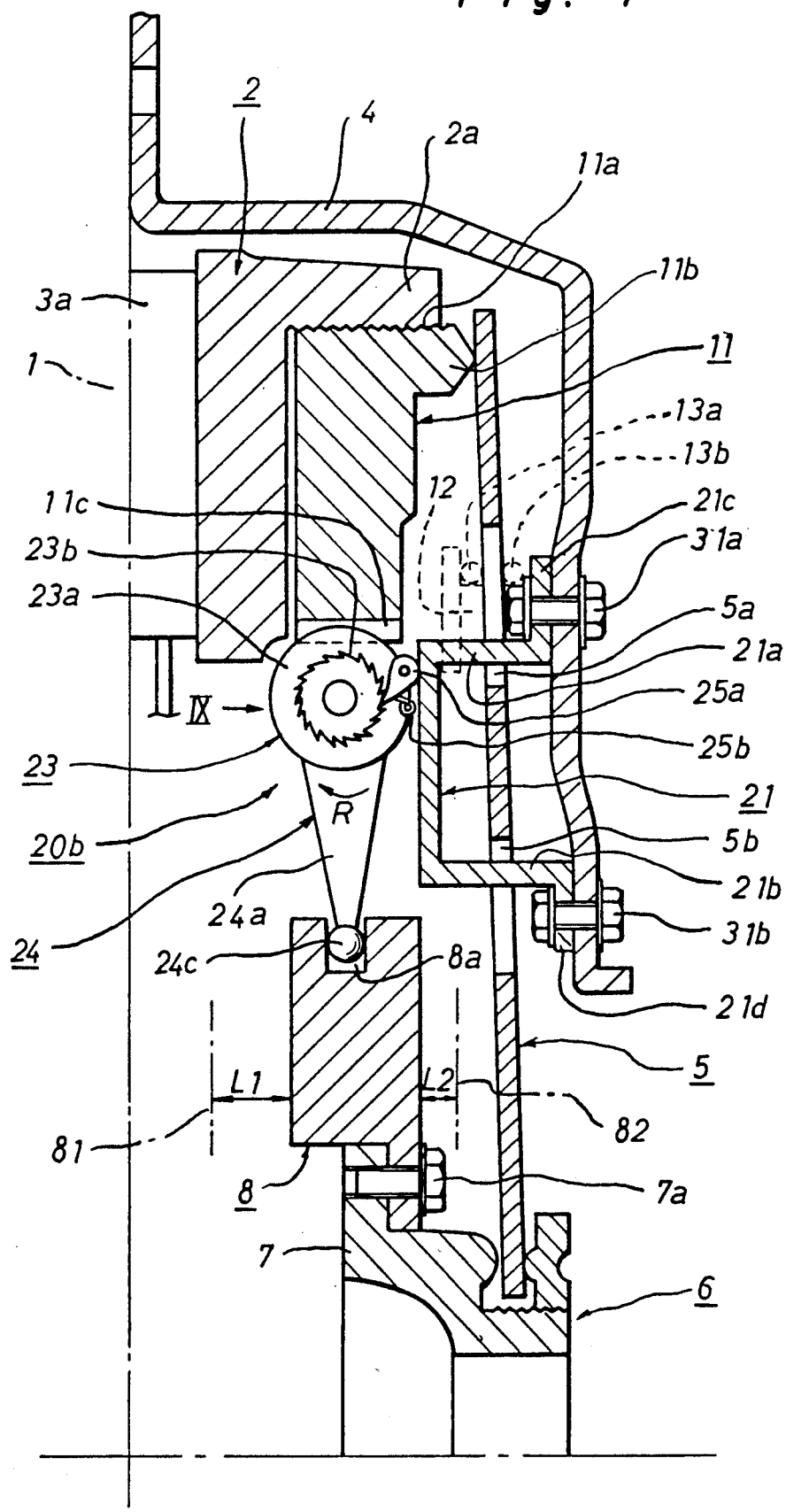
FIG. 7 is a vertical sectional view, similar to FIG. 1, but showing a third embodiment of this invention.
Figure 10:
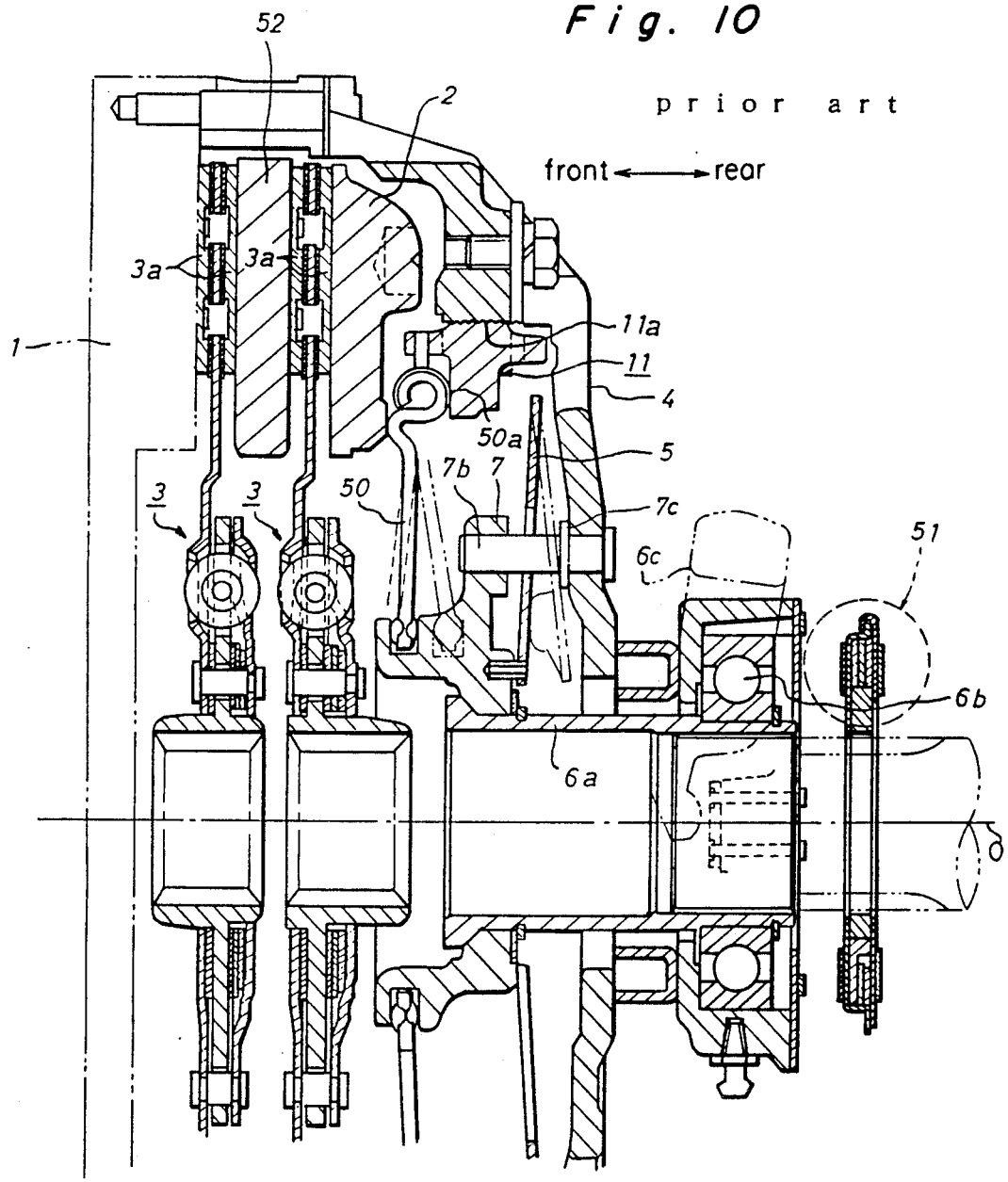
FIG. 10 is a vertical sectional view showing a push-type clutch equipped with a conventional self adjuster.

FIG. 7 is the vertical sectional view showing the push-type clutch equipped with the self adjuster of third embodiment of this invention. FIG. 8 is an oblique exploded view before assembling the self adjuster. FIG. 9 is a view in the direction of arrow IX of FIG. 7. A self adjuster 20b of the third embodiment is different from the self adjuster 20 of the first embodiment in the following point.

In the self adjuster 20b, a spherical body 24c is provided at a tip end of an arm 24a of the sensing lever 24, and the spherical body 24c fits in the concave portion 8a (FIG. 7) of the bracket 8. A cylindrical free rotor 27 (FIG. 8) is fitted freely rotatably onto the pin 22 between the worm wheel 23 and the sensing lever 24, and a ratchet tooth surface 27b, mating with ratchet tooth surface 24c is formed on a sensing lever 24 side end face of free rotor 27. The ratchet tooth surfaces 24c and 27b are so formed that they function in the same way as the ratchet tooth surfaces 24c and 23c of the second embodiment. A projection 23d is formed on a left end portion in FIG. 9 of the flywheel 23 in place of the ratchet tooth surface, and a notch 27a, in which the projection 23d fits, is formed at the worm wheel 23 side of the free rotor 27. A circumferential width δ3 of the notch 27a and a circumferential width δ4 of the projection 23d are so preset that a difference between δ3 and δ4 becomes equal to a rotation distance of the sensing lever 24 which rotates according to an axial movement L1 (FIG. 7) of the bracket 8 accompanied by the releasing/engaging operation, under the ordinary state, before wearing of the facing 3a. The plays δ3 and δ4 for the sensing lever 24 and the free rotor 27, in relation to the worm wheel 23, are thus provided, so that the play creating mechanism for inhibiting the positional adjustment of the adjust ring 11 by the self adjuster 20b when the facing 3a is not worn can be composed. Stopper 25a has an elliptical disc-like body, including a sharp tip end, and is urged so that its tip end is mated with the ratchet external tooth 23b by a torsion spring 25b. Other structures are the same as those of the first and second embodiments, and symbols in FIG. 8 same as those of FIG. 1 through FIG. 6 correspond to the same or equivalent components.

Function will be described hereunder. FIG. 7 shows the clutch engaging state before wearing of the facing 3a. When the bracket 8 moves by the distance L1 (FIG. 4) in the axial direction up to the position of 81 in the engaging/releasing operation before wearing of the facing 3a, the self adjuster 20b functions as follows.

When the bracket 8 moves by the distance L1 up to the position 81 in the releasing operation, the sensing lever 24 rotates by a distance corresponding to L1, in the direction R, because the spherical body 24c fits in the concave portion 8a of the bracket 8. Since the ratchet tooth surface 24c of the sensing lever 24 mates with the ratchet tooth surface 27b of the free rotor 27 in the direction R, the sensing lever 24 rotates together with the free rotor 27 by the distance corresponding to L1 in the direction R. However, since δ3 of the notch 27a and δ4 of the projection 23d are preset as described above, rotations of the sensing lever 24 and the free rotor 27 are absorbed by the difference between δ3 and δ4 and are not transmitted to the worm wheel 23 so that the worm wheel 23 does not rotate. Further, when the bracket 8 is returned by the engaging operation from the position 81 to the state of FIG. 7, the ratchet tooth surface 24c of the sensing lever 24 slides and rotates in relation to the ratchet tooth surface 27b so that the free rotor 27 and the worm wheel 23 do not rotate. Consequently, the worm wheel 23 does not rotate in the clutch engaging/releasing operation before wearing of the facing 3a, so that the adjust ring 11 does not rotate and the positional adjustment by the self adjuster 20c is not carried out.

In the clutch engaging state, when the bracket 8 is moved by L2 (FIG. 7) in the direction opposite to the flywheel 1 up to the position 82 due to the wear of the facing 3a, the ratchet tooth surface 24c of the sensing lever 24 slides and rotates, by a distance corresponding to L2, relatively to the ratchet tooth surface 27b so as to contact newly with the ratchet tooth surface 27b. When the bracket 8 is released from the position 82 to the position 81, the sensing lever 24 is moved together with the free rotor 27 in the direction R with the ratchet tooth surface 24c newly mated with the ratchet tooth surface 27b. This rotation distance is a sum of distance corresponding to L1 and distance corresponding to L2. The distance corresponding to L1 is absorbed by the difference between δ3 and δ4 but that corresponding to L2 is not absorbed, so that the sensing lever 24 and the free rotor 27 rotate together with the worm wheel 23 by the distance corresponding to L2. As the worm wheel 23 rotates, the rack 11c of the adjust ring 11 is rotatably driven by the worm threaded part 23a so that the adjust ring 11 is moved to the diaphragm spring 5 side by means of the screw pitch of the threaded part 11a. Accordingly, the adjust ring 11 is moved to the diaphragm spring 5 side until the facing 3a comes into the initial state before wearing out of the facing 3a by repeating the clutch releasing/engaging operations, so that the relative positional relations between the diaphragm spring 5, the adjusting ring 11 etc. can be adjusted automatically.

The number of above-mentioned self adjuster 20 (20a, 20b) of the first through third embodiments is not limited to only one for each clutch, but may be plural.

In the self adjuster 20 (20a, 20b) of this invention, as described above, the release bearing mechanism 6, to which the inner peripheral part of the diaphragm spring 5 is coupled, is pushed toward the flywheel 1 side and the outer peripheral part of the diaphragm spring 5 is moved to the opposite direction to release the clutch; characterized by that the facing wear adjustment ring 11 is threaded into the inside face of the pressure plate 2 so as to be movable in the clutch axial direction. The worm wheel 23 is rotated, by the bracket 8 moving in the clutch axial direction, so as to rotate the adjust ring 11 when the facing 3a is worn. Therefore, the adjust ring 11 can be adjusted its position automatically to the diaphragm spring 5 side by the wear amount of the facing 3a. Accordingly, even after the facing 3a is worn, a pressing load of the diaphragm spring 5 onto the facing 3a, the torque capacity of the clutch and the treading force on clutch pedal etc. can be maintain at substantially the same values before of the clutch facing. Further, in a clutch disc wherein a wear clearance of the facing 3a is increased, it becomes possible to allow the clutch cover 4 to operate up to the full wear clearance of the facing 3a. Moreover, the service life of the clutch can be prolonged.

What is claimed is:

1. In a push-type clutch wherein a release bearing, to which an inner peripheral part of a diaphragm spring is coupled, is pushed toward a flywheel side and moves an outer peripheral part of said diaphragm spring in an opposite direction to release said clutch; a self adjuster for said push-type clutch having a clutch facing wear adjustment ring for contact with an outer peripheral part of said diaphragm spring from a side of said diaphragm spring facing said flywheel threaded into an inside face of a pressure plate for movement in an axial direction relative to said clutch, a stay bracket having two support lugs extending adjacent an inner end of said adjustment ring with a width between said brackets in a clutch circumferential direction, secured to a clutch cover, a pin with each of its ends secured to a respective one of said support lugs, a worm wheel having a worm thread on its outer peripheral surface fitted onto one support lug side end of said pin and freely rotatable on said pin, said worm wheel having ratchet external teeth for one direction rotation of said worm wheel formed on said outer peripheral surface of said worm wheel on a support lug side end portion of said worm wheel and ratchet teeth on an end surface of said worm wheel, a stopper mating with said ratchet teeth on said outer peripheral surface of said worm wheel for preventing said worm wheel from rotating in a direction reverse to said one rotation direction and is secured to said stay bracket, a sensing lever having an arm extending in a direction radially inward of said clutch and installed on the other support lug side of said pin for rotation on said pin and having a ratchet tooth surface thereon for engagement with said ratchet teeth on said end surface of said worm wheel, a tip end of said arm on said sensing lever being located in a concave portion at an outer peripheral surface of a bracket connected to said release bearing, said ratchet tooth surface on said sensing lever preventing said sensing lever from rotating in the rotatable direction of said ratchet external teeth and permitting said sensing lever to rotate in an opposite direction relatively to said worm wheel, a spring member for pressing said sensing lever toward said worm wheel, said tip end of said sensing lever arm and said concave portion of said bracket and said ratchet teeth on said sensing lever and said worm wheel being relatively positioned for permitting said sensing lever to rotate relative to said pin upon movement of said bracket during clutch engagement and clutch release before said clutch facing wear without rotating said worm wheel and for rotating said worm wheel and racking said adjustment ring for moving said adjustment ring toward said diaphragm spring side after said clutch facing is worn.

2. A self adjuster for a push-type clutch as set forth in claim 1, in which a sensing pin parallel with said pin secured to said support lugs is installed at said tip end of said arm on said sensing lever, said sensing pin being located in said concave portion on said release bearing bracket, said concave portion having opposing side walls with a clearance between said sensing pin and said opposing side walls in the axial direction of said concave portion, said ratchet teeth on said end surface of said worm wheel and of said ratchet teeth on said sensing lever having a pitch of a specified length so that, under a clutch engaging state before wear of said clutch facing, said sensing pin contacts with a flywheel side wall of said opposing walls of said concave portion and apexes of said ratchet teeth on said sensing lever contact with apexes of said ratchet teeth on said end surface of said worm wheel without rotating said worm wheel, said clearance being at a value smaller than an axial moving distance of said release bearing bracket during releasing/engaging operations before wear of said clutch facing, said length of said pitch being at a value equal to a rotating distance of said sensing lever produced when said release bearing bracket moves by a distance corresponding to a difference between said moving distance of said bracket and said clearance while rotating said sensing lever.

3. A self adjuster for a push-type clutch as set forth in claim 1, in which a sensing pin parallel with said pin secured to said support lugs is positioned at the tip end of said arm on said sensing lever, said sensing pin located in said concave portion on said release bearing bracket, said concave portion having opposing side walls with a clearance between said sensing pin and said side walls in the axial direction of said concave portion, said ratchet teeth on said end surface of said worm gear and said ratchet teeth on said sensing lever having a pitch of a specified length so that, under a clutch engaging state before wear of said clutch facing, said sensing pin contacts a flywheel side wall of said concave portion and contacting surfaces of said ratchet teeth mate with each other without rotating said worm wheel and moving said adjustment ring and for rotating said worm wheel and moving said adjustment ring under a clutch engaging state after wear of said clutch facing.

4. A self adjuster for a push-type clutch as set forth in claim 1, in which a spherical body is installed at said tip end of said arm of the sensing lever, said spherical body being fitted in said concave portion of the bracket, a cylindrical rotatably free rotor is fitted onto said pin fixed to said support lugs between said worm wheel and said sensing lever, a ratchet tooth surface mating with said ratchet tooth surface of said sensing lever is formed on a sensing lever end face of said free rotor with a pitch between said mating teeth, a projection formed on an end wall of said worm wheel, a notch formed on an end wall of said worm wheel side of said free rotor and engaging said projection on said end wall of said worm wheel, the width of said notch and the width of said projection being preset to provide play between said free rotor and said worm wheel for preventing said sensing lever from rotating said worm wheel and moving said adjustment ring when said sensing lever is rotated for releasing and engaging said clutch before wear of said clutch facing and for rotating said worm wheel and moving said adjustment ring when said sensing lever is rotated for releasing and engaging said clutch after said clutch facing is worn.

* * * * *